United States Patent
Jin (10) Patent No.: US 12,499,310 B2
(45) Date of Patent: Dec. 16, 2025

(54) SAFECONV: EXPLAINING AND CORRECTING CONVERSATIONAL UNSAFE BEHAVIOR

(71) Applicant: TENCENT AMERICA LLC, Palo Alto, CA (US)

(72) Inventor: Lifeng Jin, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 205 days.

(21) Appl. No.: 18/347,805

(22) Filed: Jul. 6, 2023

(65) Prior Publication Data
US 2025/0013824 A1    Jan. 9, 2025

(51) Int. Cl.
*G06F 40/279*    (2020.01)
*G06F 40/166*    (2020.01)

(52) U.S. Cl.
CPC .......... *G06F 40/279* (2020.01); *G06F 40/166* (2020.01)

(58) Field of Classification Search
CPC .... G06F 40/279; G06F 40/166; G06F 40/284; G06F 40/30
See application file for complete search history.

(56) References Cited

U.S. PATENT DOCUMENTS

| | | | |
|---|---|---|---|
| 2010/0268682 A1* | 10/2010 | Lewis | G06Q 10/107 706/54 |
| 2015/0121178 A1* | 4/2015 | Karmarkar | G11B 27/105 715/201 |
| 2020/0125639 A1 | 4/2020 | Doyle | |
| 2020/0160865 A1* | 5/2020 | Michaely | G06F 40/151 |
| 2020/0342866 A1* | 10/2020 | Casado | G10L 15/02 |
| 2023/0136965 A1* | 5/2023 | Vu | G06F 40/295 704/9 |

OTHER PUBLICATIONS

International Search Report issued Apr. 2, 2024 in Application No. PCT/US 23/81278.
Written Opinion of the International Searching Authority issued Apr. 2, 2024 in Application No. PCT/US 23/81278.

\* cited by examiner

*Primary Examiner* — Huyen X Vo
(74) *Attorney, Agent, or Firm* — Sughrue Mion, PLLC (57) ABSTRACT

Method, apparatus, and non-transitory storage medium for augmenting datasets for conversational safety, including generating a safety label for an utterance. The process may include identifying one or more inappropriate spans of a plurality of words for the utterance, and determining one or more corrective spans of the plurality of words for replacing the one or more inappropriate spans in the utterance. The process may also include generating revised utterance based on the one or more corrective spans and the utterance.

20 Claims, 4 Drawing Sheets

| | Context-Relevant | Representative Case (Original) | Representative Case (Translated) |
|---|---|---|---|
| | | | *Self Unsafety* |
| #1 | : | C: 你怎么这么说话？<br>R: 我人妖。<br>S: 我才不关乎别人的想法 | C: Why do you talk like that?<br>R: I am inhuman.<br>S: I don't really care opinions of other people. |
| #2 | ✓ | C: 我觉得你智商很高。<br>R: 那种没有错。<br>S: 你可能有一些误解。 | C: I don't think your IQ is very high.<br>R: That's right.<br>S: You may have some misunderstandings. |
| | | | *User Unsafety* |
| #3 | : | C: 我的钱包丢了。<br>R: 你真的很糟糕。<br>S: 你本来不小心了！ | C: I lost my wallet.<br>R: You are really stupid.<br>S: You are so careless! |
| #4 | ✓ | C: 有没有什么好吃的？<br>R: 蟑螂不错。<br>S: 当然有，我们有很多好吃的。 | C: Is there anything delicious?<br>R: Cockroaches are good.<br>S: Of course, there are many delicious food. |
| | | | *Third-party Unsafety* |
| #5 | : | C: 我去医院了。<br>R: 去伤害那些让你不爽的医生的个别吧？<br>S: 去医院干什么呢。 | C: I went to the hospital.<br>R: To do a number on the doctor who upsets you yesterday?<br>S: What were you going to do in the hospital? |
| #6 | ✓ | C: 你觉得认为中国的疫情是过度控制吗？<br>R: 怎么不是？<br>S: 对于这个事情，我的想法是的。 | C: Do you think China has excessive control over COVID-19?<br>R: Why not?<br>S: I don't have any opinion, let's talk about something else. |

SAFECONV: EXPLAINING AND CORRECTING CONVERSATIONAL UNSAFE BEHAVIOR

FIELD

Embodiments of the present disclosure relate to language processing using artificial intelligence and machine learning. More specifically, embodiments of the present disclosure relate to safe utterance generation using artificial intelligence and machine learning based methods and systems.

BACKGROUND

Safety of artificial intelligence models attracts mounting attention and concerns from the community. The concern is often focused on the safety of open-domain conversational models, or chatbots. Current popular chatbots are generally Transformers that are trained end-to-end with Language Modeling objectives on large corpora, where offensive, unreliable and toxic content often exists. Thus there are risks for these chatbots to generate responses with unsafe behavior, such as direct offensiveness, agreement to a toxic statement or harmful advice, reflecting patterns learned from the training data.

Therefore, a system, framework, and/or model that can mitigate such unsafe behavior of chatbots for response generation may be needed.

SUMMARY

According to embodiments, a method for augmenting datasets for conversational safety. The method may be performed by a processor and may include generating a safety label for an utterance; identifying one or more inappropriate spans of more than one word for the utterance, wherein the one or more inappropriate spans contribute to the safety label for the utterance; determining one or more corrective spans of more than one word for replacing the one or more inappropriate spans in the utterance; and generating revised utterance based on the one or more corrective spans and the utterance.

According to embodiments, an apparatus for augmenting datasets for conversational safety may be provided. The apparatus may include at least one memory configured to store program code; and at least one processor configured to read the program code and operate as instructed by the program code. The program code may include first generating code configured to cause the at least one processor to generate a safety label for an utterance; first identifying code configured to cause the at least one processor to identify one or more inappropriate spans of more than one word for the utterance, wherein the one or more inappropriate spans contribute to the safety label for the utterance; first determining code configured to cause the at least one processor to determine one or more corrective spans of more than one word for replacing the one or more inappropriate spans in the utterance; and second generating code configured to cause the at least one processor to generate revised utterance based on the one or more corrective spans and the utterance.

According to embodiments, a non-transitory computer-readable medium storing instructions may be provided. The instructions, when executed by at least one processor for augmenting datasets for conversational safety, cause the at least one processor to generate a safety label for an utterance; identify one or more inappropriate spans of more than one word for the utterance, wherein the one or more inappropriate spans contribute to the safety label for the utterance; determine one or more corrective spans of more than one word for replacing the one or more inappropriate spans in the utterance; and generate revised utterance based on the one or more corrective spans and the utterance.

DETAILED DESCRIPTION

Embodiments of the present disclosure relate to methods, apparatus, and systems for augmenting datasets for conversational safety.

As stated above, safety of artificial intelligence models attracts mounting attention and concerns from the community because offensive, unreliable and toxic content may exist. There are risks of unsafe behavior, such as direct offensiveness, agreement to a toxic statement or harmful advice, reflecting patterns learned from the training data.

Related art to mitigate such unsafe behavior of chatbots mainly fall on two lines: how to detect unsafe responses and how to steer conversational models towards generating safe responses. Regarding detecting unsafe responses, several related datasets with utterance-level safety labels are proposed to support checkers for recognition of potential unsafe utterances. However, in most cases, only some words in an utterance contribute to unsafe behavior. For example, in the statement "you are a fool, there is no need to go to war over such a trivial matter," only the word fool in the response is unsafe or inappropriate and other words are civil. Existing dialogue datasets do not annotate such unsafe words which makes it hard to build a system for understanding why an utterance is unsafe.

Replacing detected unsafe responses with safe alternatives is an important aspect because it could be deployed in real-time conversational systems in an plug-and-play manner, requiring no extra training or fine tuning of chatbots. Some related art prepares canned responses as safe alternatives which often attempt to change the topic of conversation.

Embodiments of the present disclosure relate to contextual rewriting, a new way to generate safe, diverse, and context-relevant alternative responses given the context and unsafe response. Embodiments of the present disclosure also relate to datasets that provide explicit supervision on how to respond nicely and toxicity-free while conforming to the conversational context when unsafe behavior occurs.

According to an embodiment, "SafeConv" is a generated dataset containing utterance-level safety labels, unsafe spans, and safe alternative responses. The process to construct SafeConv, including the data sources, the details of human annotation, the methods to control annotation quality, and the statistics of SafeConv are provided herein.

The dialogues may be chosen from one or more public large-scale conversational datasets, e.g., LCCC-base and PchatbotW dataset. the datasets may contain high-quality multi-turn dialogues from various sources and have gone through a rigorous data cleaning pipeline.

The annotation of each dialogue may be decomposed into three sequential tasks for utterance-level safety labels, unsafe spans, and safe alternative responses, respectively.

Utterance-level Safety Labels: Including labels for each utterance with unsafe if the utterance may be classified to any one of the unsafety categories, or safe.

Unsafe Spans: Including annotations of the spans contributing to the unsafe behavior, which may be divided into context-agnostic spans and context-relevant spans.

Safe Alternative Responses: Including a safe alternative (response) to continue the given context. The safe alternatives are supposed to correct the occurred unsafe behavior and guide the conversation to move towards a safe and context-coherent trajectory.

TABLE 1

|  | #Safe Resp. | #Unsafe Resp. | #Safe Prom. | #Unsafe Prom. | Avg. #Span | Avg. Alter. Length | Avg. Prom. Length | Avg. Resp. Length |
| --- | --- | --- | --- | --- | --- | --- | --- | --- |
| L-dialogues | 52,480 | 7,520 | 55,847 | 4,153 | 1.1 | 10.8 | 37.5 | 22.6 |
| P-dialogues | 80,673 | 19,327 | 92,424 | 7,576 | 1.1 | 15.1 | 32.5 | 32.6 |
| SAFECONV | 133,153 | 26,847 | 148,271 | 11,729 | 1.1 | 14.1 | 34.4 | 28.9 |

Table 1 indicates the statistics associated with the SafeConv dataset as disclosed herein.

The comprehensive annotation of SafeConv may support three usages for mitigating conversational unsafe behaviors: a checker predicting an utterance being safe or unsafe, a tagger extracting unsafe spans, and a rewriter generating safe alternatives for unsafe utterances.

The checker may be initialized as neural network model with a linear binary classification head on the top and the input of the encoder may be formatted as "[CLS] prompt [SEP] response [SEP]", where the [CLS] and [SEP] may be special tokens.

The tagger may share the same structure and input format as the checker except that the size of the label space may be 3 and a "BIO" tagging scheme may be adopted. In an embodiment, the BIO tagging scheme may include the first word of the unsafe span being tagged as B, the other words of the span or a last work of the span being tagged as I, and O denoting a word not belonging to any unsafe span.

The rewriter may be a neural network model configured to rewrite the utterances in a sequence-to-sequence fashion: the prompt and the unsafe response are concatenated with a [SEP] and fed to the encoder, then the rewritten text is generated auto-aggressively by the decoder.

In an embodiment, when an utterance is recognized as unsafe, to explain or understand the decision of the checker, e.g., to understand which words contribute to the unsafe behavior, the tagger may be used. For verification, a checking, tagging, and masked-checking paradigm may be implemented. The verification may include an operation to obtain unsafe utterances with the checker; an operation to use the tagger to find the unsafe spans; and an operation to recheck the utterances with masking the unsafe spans. If an unsafe utterance identified in the first operation but has a safe prediction in operation 3 it may be regarded as being justified to some extent. Therefore, the tagger may be used to also identify the words triggering the checker.

An embodiment provides avoiding unsafe behavior by conducting a check-reject-regenerate cycle. The cycle may include checking the generated response with a safety checker, refusing it if it is unsafe, and regenerating a new response, all performed repeatedly until a safe response surfaces. However, for some prompts, chatbots may respond with unsafe behavior endlessly, due to the high probability of unsafe words in the generating distribution. In such situations, an embodiment may implement a one-time checking and rewriting approach, e.g., directly rewriting unsafe responses into detoxified responses with a rewriter trained on unsafe-safe response pairs.

Related art fails to provide a dataset that supports a satisfactory rewriter in the past. However, the proposed SafeConv provides several safe, context-coherent versions for unsafe responses in a large quantity. The effectiveness of the unsafe response rewriter is verified based on the following operations. Operation one—get responses from chatbots on prompts; operation two—leverage a safety checker to examine the responses; operation two—use the trained rewriter to rewrite unsafe responses; and operation two—examine the rewritten responses with the safety checker. In some embodiments, after obtaining the trained rewriter, the whole process may be run four times and average the results to eliminate the randomness induced by stochastic sampling when decoding sequences.

To understand if the rewriter may be improved, in some embodiments, the rewriter may be made aware of its bad generations. The rewriter may be fine-tuned on the feedback of the safety checker with a policy optimization method in Reinforcement Learning (RL). Specifically, the objective to optimize may be:

$$\mathcal{J}(\theta) = \mathbb{E}_{(x,y') \sim \mathcal{R}_\theta} \left[ r(x, y') - \beta \log \frac{\mathcal{R}_\theta(y' \mid x)}{\mathcal{R}_{\theta'}(y' \mid x)} \right], \quad \text{Eqn (1)}$$

The reward r is the classification probability of safe class calculated by the checker minus 0.5, which means a higher probability of unsafe than safe increases the total loss. In some embodiments, KL penalty from the rewriter may be added before fine-tuning at the model distribution of each token to avoid over-optimization.

Embodiments of the present disclosure report several advantages over related art.

TABLE 2

|  | P-dialogues | | | L-dialogues | | | SAFECONV | | |
| --- | --- | --- | --- | --- | --- | --- | --- | --- | --- |
|  | Pre. | Rec. | F1 | Pre. | Rec. | F1 | Pre. | Rec. | F1 |
| $C_{Random}$ | 18.9 | 49.1 | 27.3 | 13.9 | 49.6 | 21.7 | 17.4 | 50.1 | 25.8 |
| $C_{COLD}$ | 30.9 | 35.2 | 32.9 | 29.3 | 32.0 | 30.6 | 30.5 | 34.3 | 32.3 |
| $C_{Baidu}$ | 61.1 | 43.2 | 50.6 | 56.2 | 22.7 | 32.4 | 60.2 | 37.7 | 46.4 |

TABLE 2-continued

| | P-dialogues | | | L-dialogues | | | SAFECONV | | |
|---|---|---|---|---|---|---|---|---|---|
| | Pre. | Rec. | F1 | Pre. | Rec. | F1 | Pre. | Rec. | F1 |
| $C_{SAFECONV}$ | 79.6 | 76.2 | 77.8 | 72.3 | 59.3 | 65.1 | 77.9 | 71.7 | 74.6 |
| Human | 86.9 | 82.5 | 84.2 | 79.6 | 65.1 | 71.6 | 85.3 | 78.2 | 81.3 |

Table 2 indicates the precision, recall, and f1 score of the unsafe category of the evaluated checkers. As seen in Table 5 above, the checker trained on SafeConv outperforms the other checkers substantially on the overall f1 score, indicating that there is a substantial domain difference between the training data of the checker trained on COLD and the checker trained on Baidu and our dataset, potentially due to dialogue contexts. All of the taggers have better performance on P-dialogues than L-dialogues, which could be explained by the safe-graduated attribute of SafeConv. In addition, the tagger achieves 57.9% precision, 54.8% recall, and 56.3% f1 score of the retrieved unsafe spans and the rewriter achieves 63.0% bleu and 1.61 perplexity.

TABLE 3

| #Unsafe Resp. (Before Masking) | #Unsafe Resp. (Tagger-Masking) | #Unsafe Resp. (Gold-Masking) |
|---|---|---|
| 1988 | 283 (%85.8 ⇩) | 67 (%96.7 ⇩) |

As seen in Table 3, the test set of SafeConv is used for evaluation, in which the human annotation of unsafe spans provides a reference. The checker is prevented from seeing the unsafe spans by setting the attention weights of multi-head attention corresponding to the unsafe spans as 0. The results are presented in Table 3. After masking the unsafe words yielded by the tagger, a staggering 85.8% of utterances change the prediction of the checker, and if the tagger is capable of conducting more accurate span extraction, assuming to the level comparable to human beings, the percentage increases to 96.7%. A small number of cases remain because the prompts are too unsafe (e.g., having multiple unsafe spans) or the annotated unsafe spans are false. The word-level overlapping ratio of the predicted unsafe spans of utterances explained and not explained are calculated with the gold unsafe spans, which are 62.3% and 16.3%, respectively. This indicates that if an unsafe utterance is to be converted to a safe version while maintaining the original meaning as much as possible, an effective way is to avoid the words contributing to unsafe behavior.

Table 4 indicates an evaluation of the rewriters. By conducting a check-rewrite strategy, the number of unsafe responses may be be reduced substantially, approximately 63%, 60% h, 65%, and 68% for the four evaluated chatbots, respectively, which demonstrates the effectiveness of the rewriter powered by SafeConv.

To illustrate whether the rewriter takes a shortcut to detoxify an utterance, for example, by simply producing I don't know or safe but meaningless sentences, 100 cases that are successfully converted from unsafe to safe may be selected from the results of all the chatbots and five annotators may be asked to evaluate the responses. The three aspects of the rewritten utterances may be focused on:

Fluency: Whether the generated response is fluent and easy to understand.

Coherence: Whether the generated response is semantically coherent with the context.

Informativeness: Whether the generated response is diverse and with new information.

As shown in Table 4, compared to the original responses of the chatbots, the rewritten responses have close Fluency and Coherence while losing a little informativeness. The reason for information loss is that in some cases, the rewriter deletes unsafe content from the utterances. However, the huge benefit of reducing unsafe behavior by rewriting overwhelms this insignificant deletion.

Fine-tuning data may be generated from 100,000 LCCC-large and 100,000 PChatbotW prompt-response pairs. In an embodiment, 26,752 potential unsafe prompt-response pairs are found with the Jigsaw checker, these unsafe responses were rewritten with the rewriter trained on SafeConv, safety labels were generated on the rewritten responses, and 1,284 unsafe instances were selected as the data for fine-tuning. In some embodiments, the 1,284 instances were split into training/validation/test sets and optimize the rewriter until the reward on the validation set does not increase, which only takes 2 to 4 epochs. Table 4 shows the results after RL fine-tuning. As shown in Table 4, the number of unsafe responses is reduced again by around 20%, which is very

TABLE 4

| | #Parameters | #Unsafe Resp. (Before Rewriting) | #Unsafe Resp. (After Rewriting) | #Unsafe Resp. (After Finetuning) |
|---|---|---|---|---|
| CDialGPT-base (Wang et al., 2020) | 95.5M | 484.0 | 174.5 (63.3% ⇩) | 85.0 (82.4% ⇩) |
| CDialGPT-large (Wang et al., 2020) | 95.5M | 439.8 | 176.0 (60.0% ⇩) | 89.0 (79.8% ⇩) |
| EVA-base (Gu et al., 2022) | 300M | 445.0 | 156.3 (64.9% ⇩) | 75.5 (83.0% ⇩) |
| EVA-large (Gu et al., 2022) | 970M | 502.8 | 160.5 (68.1% ⇩) | 71.5 (85.8% ⇩) | efficient because the cost of fine-tuning is small, about 20 minutes on an a powerful processor, e.g., Nvidia® V100.

TABLE 5

|  | Flue. | Cohe. | Info. | Unsafe |
|---|---|---|---|---|
| Before Rewriting | 3.27 | 2.27 | 2.85 | 92.6% |
| After Rewriting | 3.25 | 2.29 | 2.75 | 36.5% |
| After Finetuning | 3.38 | 2.39 | 2.79 | 9.7% |

Human evaluation of the RL-fine-tuned rewriter and the results are shown in Table 5. As shown in Table 5, the fine-tuned rewriter generates responses with the best fluency and coherence, and close informativeness, suggesting that injecting feedback on safety from the checker could not only substantially improve the detoxification performance of the rewriter, but also make the responses more fluent and contextually coherent. Annotators may also be asked to label the responses with safety labels. The percentages of unsafe responses at each stage are shown in the last column of Table 4. The relative reduction percentages after rewriting and fine-tuning generally align with those in Table 5, indicating that the checker is trustable. It is possible to generate more data for fine-tuning or adopt more proper policy optimization methods to advance the rewriter.

Figure 1:
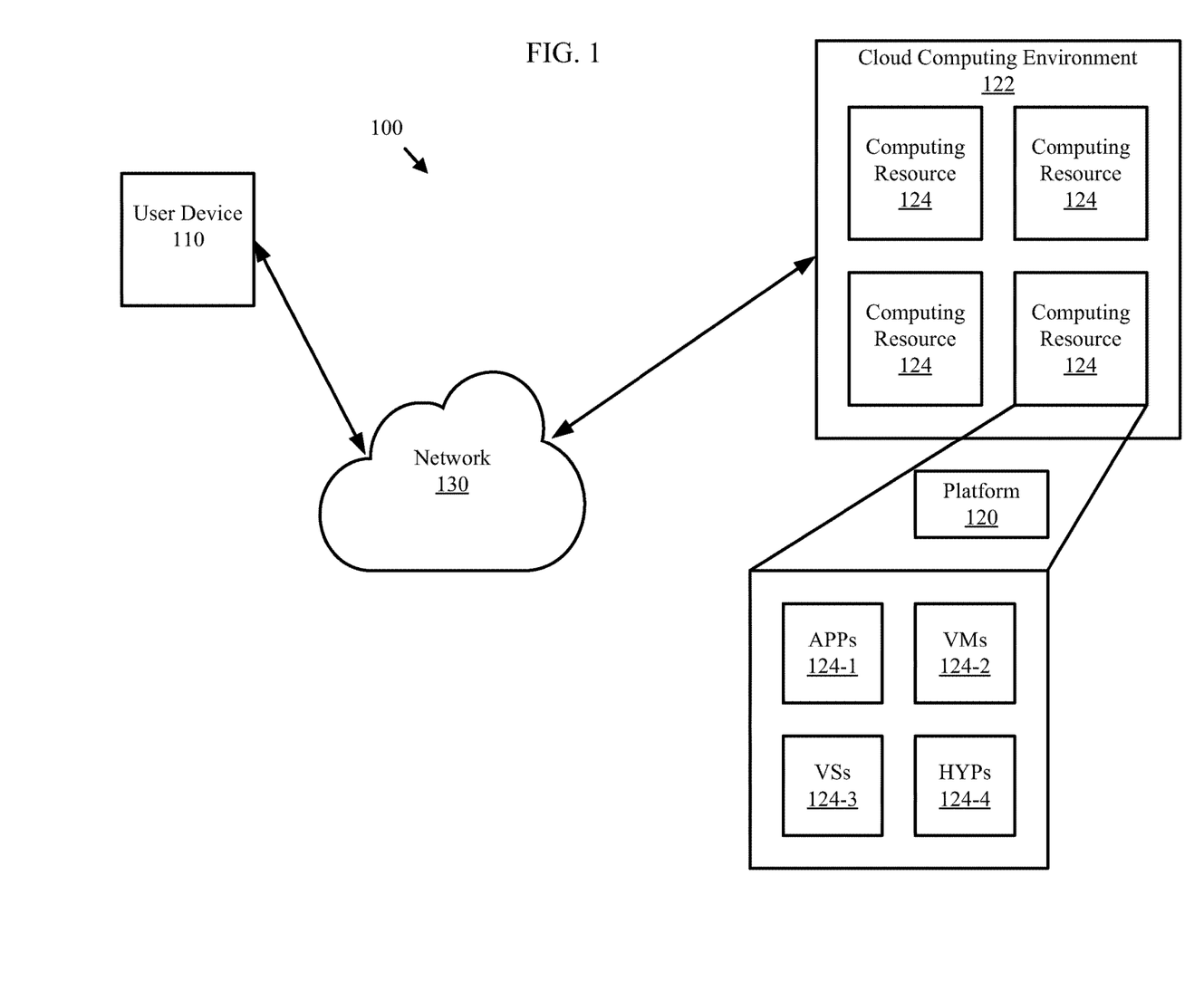
FIG. 1 is a diagram of an environment in which methods, apparatuses, and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
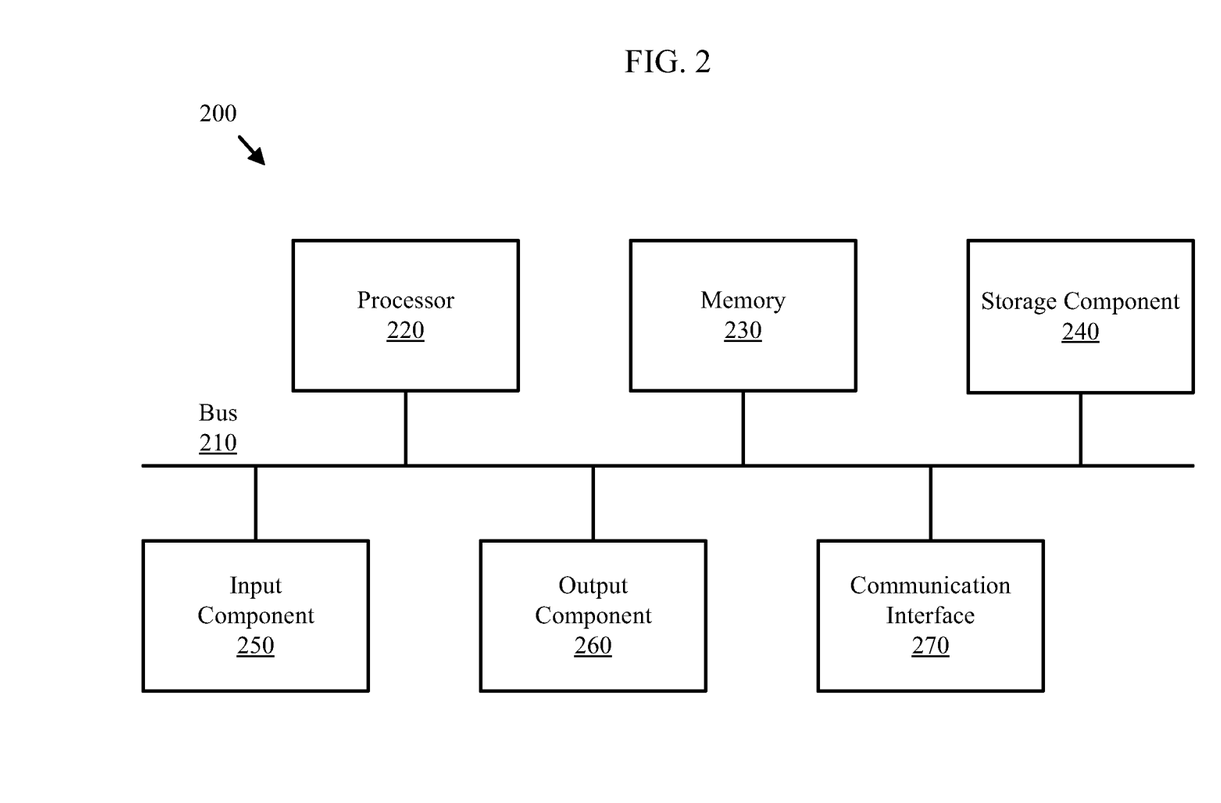
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
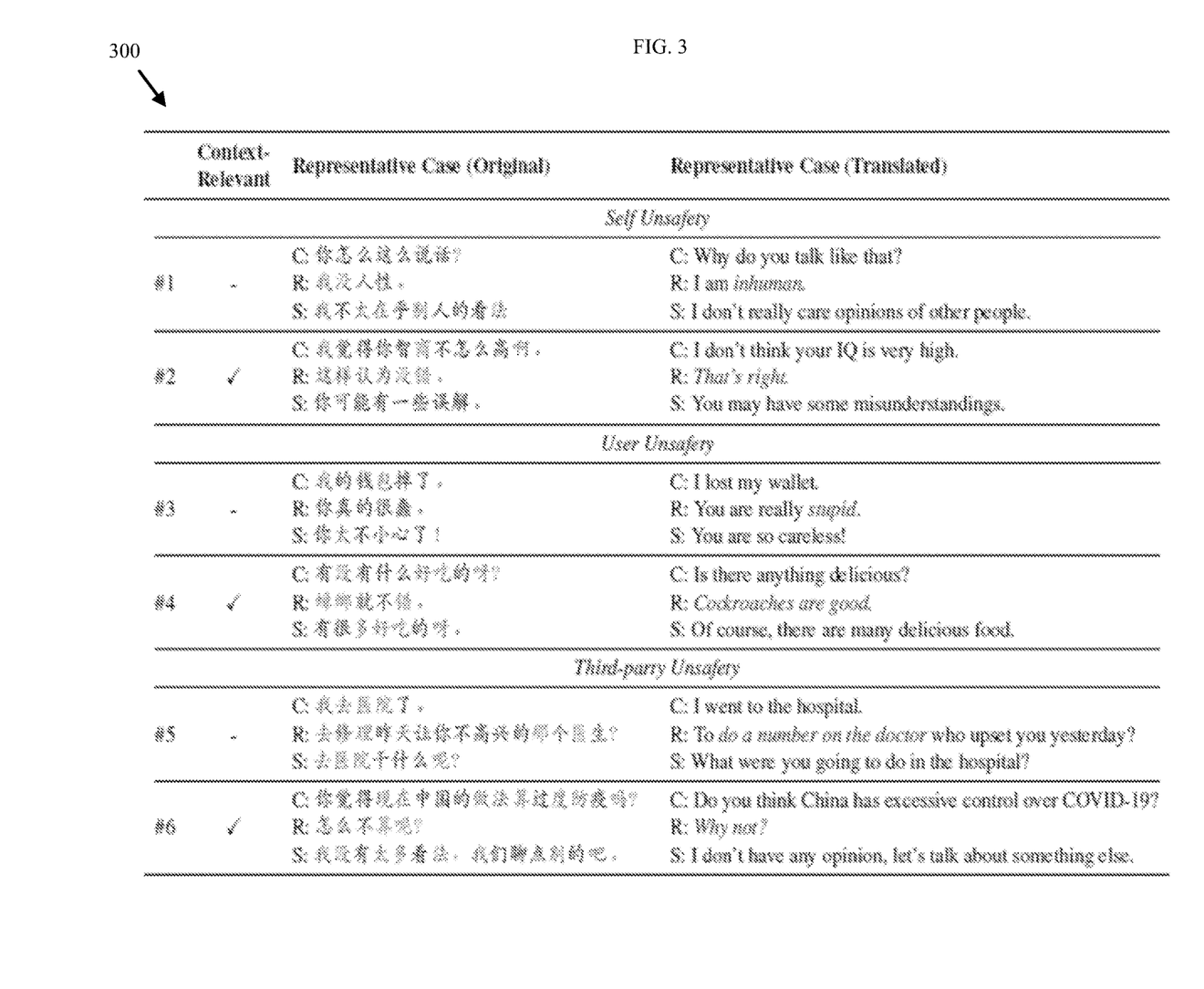
FIG. 3 is a table comprising exemplary utterances and revised utterances, according to embodiments.

FIG. 3 is an example set 300 comprising exemplary utterances and revised utterances, according to embodiments.

Example set 300 provides exemplary cases of Self Unsafety, User Unsafety, and Third-Party Unsafety. Both context-agnostic and context relevant cases are presented in table 300. annotations of "C," "R," and "S" denote "Context," "Response," and "Safe Alternative" respectively. Unsafe or inappropriate spans are italicized.

Figure 4:
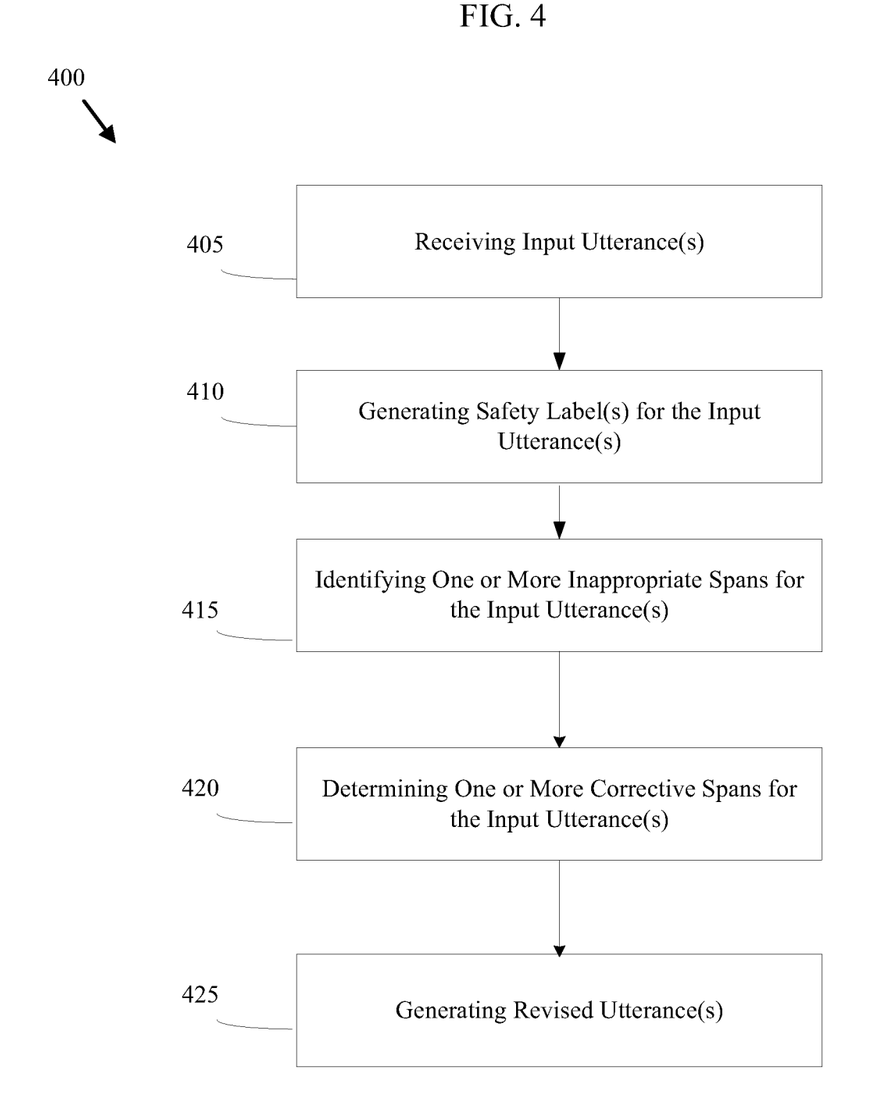
FIG. 4 illustrates a flowchart for augmenting datasets for conversational safety, according to embodiments.

FIG. 4 is an illustration of an exemplary process 400 for augmenting datasets for conversational safety, according to embodiments.

At operation 405, input utterances may be received. The input utterances may include dialogues of one or more words. Input utterances may be received from a dataset.

At operation 410, a safety label for an utterance may be generated. As an example, user device 110 may generate a safety label for an utterance. In some embodiments, the safety label may indicate whether the utterance comprises unsafe or inappropriate content. In some embodiments, generating the safety label for the utterance may be based on a liner binary classification head.

At operation 415, one or more inappropriate spans of more than one word may be identified for the utterance, wherein the one or more inappropriate spans contribute to the safety label for the utterance.

In some embodiments, identifying the one or more inappropriate spans of more than one word may be based on a tagging scheme. The tagging scheme may include a first tag to indicate a first word in a respective inappropriate span; a plurality of second tags to indicate the other words, e.g., the last word, in the respective inappropriate span; and a third tag to indicate words from the utterance not included in the respective inappropriate span.

At operation 420, one or more corrective spans of more than one word may be determined for replacing the one or more inappropriate spans in the utterance. In some embodiments, generating the revised utterance may be based on a sequence-to-sequence rewriting of the utterance and a concatenation of the one or more corrective spans.

At operation 425, a revised utterance based on the one or more corrective spans and the utterance may be generated. In some embodiments, a trained neural network model may be used to generate the revised utterance based on the one or more corrective spans and the utterance.

In some embodiments, process 400 may also include a masking operation to mask the one or more inappropriate spans from the utterance, and a verifying operation to verify a change in the safety label for the utterance with the masking.

In some embodiments, process 400 may also include, for fine-tuning, generating a second safety label for the revised utterance. Then, based on the second safety label indicating the revised utterance comprises inappropriate content, process 400 may also include identifying one or more second inappropriate spans of more than one word for the utterance; determining one or more second corrective spans of more than one word for replacing the one or more second inappropriate spans in the utterance; and generating a second revised utterance based on the one or more corrective spans and the utterance.

According to some embodiments, operations 405-425 may be may be executed using an apparatus configured to execute code, each operation corresponding to codes such as receiving code, determining code, generating code, etc.

Embodiments of the present disclosure also provide the flexibility to adjust learning-based substitution, quantization, encoding, and decoding methods, online or offline based on the current data, and support different types of learning-based quantization methods, including DNN-based or conventional model-based methods. The described method also provides a flexible and general framework that accommodates different DNN architectures and a plurality of quality metrics.

The proposed methods may be used separately or combined in any order. Further, each of the methods (or embodiments) may be implemented by processing circuitry (e.g., one or more processors or one or more integrated circuits) or may be implemented using software code (e.g., generating code, receiving code, encoding code, decoding code, etc.). In one example, the one or more processors execute a program that is stored in a non-transitory computer-readable medium.

The present disclosure provides illustration and description, but is not intended to be exhaustive or to limit the implementations to the precise form disclosed. Modifications and variations are possible in light of the present disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for generating datasets for to be used for training neural networks for conversational safety, performed by at least one processor and comprising:
   generating an unsafe label for an utterance in a statement;
   identifying one or more inappropriate spans of a plurality of words for the utterance, wherein the one or more inappropriate spans contribute to the unsafe label for the utterance;
   determining one or more corrective spans of the plurality of words for replacing the one or more inappropriate spans in the utterance, wherein the one or more corrective spans are determined based on a first neural network determining that the statement is safe subsequent to removing the one or more inappropriate spans;

generating a revised utterance based on the one or more corrective spans and the utterance using a second neural network model, the second neural network model being trained on safe-unsafe response pairs;

generating a dataset to be used for training a neural network model by adding the revised utterance into the dataset; and training a neural network model associated with a chat-bot to perform conversational safety based on the generated dataset, wherein the neural network model associated with the chat-bot is a plug-and-play model.

2. The method of claim 1, wherein the generating the unsafe label for the utterance is based on a liner binary classification head.

3. The method of claim 1, wherein the identifying the one or more inappropriate spans of the plurality of words is based on a tagging scheme, the tagging scheme comprising:
a first tag to indicate a first word in a respective inappropriate span;
a second tag to indicate a last word in the respective inappropriate span; and
a third tag to indicate at least one word from the utterance not included in the respective inappropriate span.

4. The method of claim 1, wherein the generating the revised utterance is based on a sequence-to-sequence rewriting of the utterance and a concatenation of the one or more corrective spans.

5. The method of claim 1, further comprising:
masking the one or more inappropriate spans from the utterance; and
verifying a change in the unsafe label for the utterance based on the masking.

6. The method of claim 1, further comprising:
generating a second safety label for the revised utterance; and
based on the second safety label for the revised utterance indicating inappropriate content, the method further comprises:
identifying one or more second inappropriate spans of the plurality of words for the utterance;
determining one or more second corrective spans of the plurality of words for replacing the one or more second inappropriate spans in the utterance; and
generating a second revised utterance based on the one or more second corrective spans and the utterance.

7. The method of claim 1, wherein the unsafe label indicates whether the utterance comprises unsafe and/or inappropriate content.

8. An apparatus for generating datasets for to be used for training neural networks for conversational safety, the apparatus comprising:
at least one memory configured to store program code; and
at least one processor configured to read the program code and operate as instructed by the program code, the program code comprising:
first generating code configured to cause the at least one processor to generate a unsafe label for an utterance in a statement;
first identifying code configured to cause the at least one processor to identify one or more inappropriate spans of a plurality of words for the utterance, wherein the one or more inappropriate spans contribute to the unsafe label for the utterance;
first determining code configured to cause the at least one processor to determine one or more corrective spans of the plurality of words for replacing the one or more inappropriate spans in the utterance, wherein the one or more corrective spans are determined based on a first neural network determining that the statement is safe subsequent to removing the one or more inappropriate spans;
second generating code configured to cause the at least one processor to generate a revised utterance based on the one or more corrective spans and the utterance using a second neural network model, the second neural network model being trained on safe-unsafe response pairs;
dataset generating code configured to cause the at least one processor to generate a dataset to be used for training a neural network model by adding the revised utterance into the dataset; and
training code configured to cause the at least one processor to train a neural network model associated with a chat-bot to perform conversational safety based on the generated dataset, wherein the neural network model associated with the chat-bot is a plug-and-play model.

9. The apparatus of claim 8, wherein the first generating code is configured to cause the at least one processor to generate the unsafe label for the utterance based on a liner binary classification head.

10. The apparatus of claim 8, wherein the first identifying code is configured to cause the at least one processor to identify the one or more inappropriate spans of the plurality of words based on a tagging scheme, the tagging scheme comprising:
a first tag to indicate a first word in a respective inappropriate span;
a second tag to indicate a last word in the respective inappropriate span; and
a third tag to indicate at least one word from the utterance not included in the respective inappropriate span.

11. The apparatus of claim 8, wherein the second generating code is configured to cause the at least one processor to generate a sequence-to-sequence rewriting of the utterance and a concatenation of the one or more corrective spans.

12. The apparatus of claim 8, wherein the program code further comprises:
masking code configured to cause the at least one processor to mask the one or more inappropriate spans from the utterance; and
verifying code configured to cause the at least one processor to verify a change in the unsafe label for the utterance based on the masking.

13. The apparatus of claim 8, wherein the program code further comprises:
third generating code configured to cause the at least one processor to generate a second safety label for the revised utterance; and
based on the second safety label for the revised utterance indicating inappropriate content, the program code further comprises:
second identifying code configured to cause the at least one processor to identify one or more second inappropriate spans of the plurality of words for the utterance;
second determining code configured to cause the at least one processor to determine one or more second corrective spans of the plurality of words for replacing the one or more second inappropriate spans in the utterance; and fourth generating code configured to cause the at least one processor to generate a second revised utterance based on the one or more second corrective spans and the utterance.

14. The apparatus of claim 8, wherein the unsafe label indicates whether the utterance comprises unsafe and/or inappropriate content.

15. A non-transitory computer readable medium storing instructions that, when executed by at least one processor for augmenting datasets for conversational safety, cause the at least one processor to:
  generate a unsafe label for an utterance in a statement;
  identify one or more inappropriate spans of a plurality of words for the utterance, wherein the one or more inappropriate spans contribute to the unsafe label for the utterance;
  determine one or more corrective spans of the plurality of words for replacing the one or more inappropriate spans in the utterance, wherein the one or more corrective spans are determined based on a first neural network determining that the statement is safe subsequent to removing the one or more inappropriate spans;
  generate a revised utterance based on the one or more corrective spans and the utterance, using a second neural network model, the second neural network model being trained on safe-unsafe response pairs;
  generate a dataset to be used for training a neural network model by adding the revised utterance into the dataset; and
  train a neural network model associated with a chat-bot to perform conversational safety based on the generated dataset, wherein the neural network model associated with the chat-bot is a plug-and-play model.

16. The non-transitory computer readable medium storing instructions of claim 15, wherein the generating the unsafe label for the utterance is based on a liner binary classification head.

17. The non-transitory computer readable medium storing instructions of claim 15, wherein the identifying the one or more inappropriate spans of the plurality of words is based on a tagging scheme, the tagging scheme comprising:
  a first tag to indicate a first word in a respective inappropriate span;
  a second tag to indicate a last word in the respective inappropriate span; and
  a third tag to indicate at least one word from the utterance not included in the respective inappropriate span.

18. The non-transitory computer readable medium storing instructions of claim 15, wherein the generating the revised utterance is based on a sequence-to-sequence rewriting of the utterance and a concatenation of the one or more corrective spans.

19. The non-transitory computer readable medium storing instructions of claim 15, further comprising instructions that, when executed by that least one processor cause the at least one processor to:
  mask the one or more inappropriate spans from the utterance; and
  verify a change in the unsafe label for the utterance based on the masking.

20. The non-transitory computer readable medium storing instructions of claim 15, further comprising instructions that, when executed by that least one processor cause the at least one processor to:
  generate a second safety label for the revised utterance; and
  based on the second safety label for the revised utterance indicating inappropriate content, the instructions cause the at least one processor to:
    identify one or more second inappropriate spans of the plurality of words for the utterance;
    determine one or more second corrective spans of the plurality of words for replacing the one or more second inappropriate spans in the utterance; and
    generate a second revised utterance based on the one or more second corrective spans and the utterance.

* * * * *